United States Patent
York et al.

(10) Patent No.: US 9,782,049 B2
(45) Date of Patent: Oct. 10, 2017

(54) LIQUID FILTRATION VACUUM

(71) Applicant: Intelliclean Solutions, LLC, West Palm Beach, FL (US)

(72) Inventors: Larry D. York, McMinnville, TN (US); Randy G. Spencer, McMinnville, TN (US)

( * ) Notice: Subject to any disclaimer, the term of this patent is extended or adjusted under 35 U.S.C. 154(b) by 0 days.

(21) Appl. No.: 14/885,975

(22) Filed: Oct. 16, 2015

(65) Prior Publication Data

US 2016/0106283 A1   Apr. 21, 2016

Related U.S. Application Data

(60) Provisional application No. 62/122,300, filed on Oct. 16, 2014.

(51) Int. Cl.
| | |
|---|---|
| *A47L 9/18* | (2006.01) |
| *A47L 7/00* | (2006.01) |
| *C02F 1/00* | (2006.01) |
| *C02F 1/50* | (2006.01) |

(52) U.S. Cl.
CPC ............ *A47L 9/181* (2013.01); *A47L 7/0061* (2013.01); *C02F 1/001* (2013.01); *C02F 1/505* (2013.01); *C02F 2303/04* (2013.01); *C02F 2305/08* (2013.01); *C02F 2307/12* (2013.01)

(58) Field of Classification Search
None
See application file for complete search history.

(56) References Cited

U.S. PATENT DOCUMENTS

| | | | |
|---|---|---|---|
| 1,839,582 A | 1/1932 | Nordhem | |
| 2,250,226 A | 7/1941 | Juelson | |
| 2,693,000 A | 11/1954 | Minerley | |
| 2,886,125 A | 5/1959 | Denker | |
| 2,954,095 A * | 9/1960 | Brock | A47L 5/365 |
| | | | 96/331 |
| 3,065,316 A | 11/1962 | Olson | |
| 3,318,075 A | 5/1967 | Wilson | |
| 4,290,784 A | 9/1981 | Rawicki | |
| 4,487,746 A | 12/1984 | Tahiliani | |
| 4,545,410 A | 10/1985 | Paul et al. | |
| 4,678,485 A | 7/1987 | Finley et al. | |
| 4,818,259 A | 4/1989 | Marano | |
| 4,874,404 A | 10/1989 | Boswell | |

(Continued)

FOREIGN PATENT DOCUMENTS

| | | |
|---|---|---|
| CN | 1541604 A | 11/2004 |
| CN | 201542558 | 6/2006 |

(Continued)

OTHER PUBLICATIONS

Translation of CN 201542558 U, accessed Jan. 5, 2017.*

(Continued)

*Primary Examiner* — Duane Smith
*Assistant Examiner* — Phillip Shao
(74) *Attorney, Agent, or Firm* — Larson & Larson, P.A.; Justin P. Miller; Patrick A. Reid

(57) ABSTRACT

An upright water filtration vacuum containing a antimicrobial particulate for anti-bacterial and anti-fungal properties. The water filtration vacuum device draws in the air, forcing it in to the water and mixing it with, e.g., nano-silver, returning clean, fresh air in to the home environment.

10 Claims, 10 Drawing Sheets

(56) References Cited

U.S. PATENT DOCUMENTS

| | | |
|---|---|---|
| 4,939,809 A | 7/1990 | Park |
| 5,189,757 A | 3/1993 | Williams et al. |
| 5,215,560 A | 6/1993 | Lee |
| 5,354,347 A | 10/1994 | McCoy et al. |
| 5,752,997 A | 5/1998 | Roth |
| 5,869,323 A | 2/1999 | Horn |
| 5,873,143 A | 2/1999 | Huey |
| 6,361,587 B1 | 3/2002 | Rohn et al. |
| 6,379,439 B1 | 4/2002 | Shimizu |
| 6,508,867 B2 | 1/2003 | Schoenewald et al. |
| 6,776,824 B2 | 8/2004 | Wen |
| 7,644,470 B2 | 1/2010 | Lee et al. |
| 7,819,127 B1 | 10/2010 | Huffman |
| 8,728,222 B2 | 5/2014 | Kim et al. |
| 8,753,438 B2 | 6/2014 | Dallas et al. |
| 8,881,344 B2 | 11/2014 | Akin |
| 2005/0108849 A1 | 5/2005 | Lam |
| 2006/0130265 A1* | 6/2006 | Oh .................... A47L 9/00 15/327.2 |
| 2006/0174438 A1 | 8/2006 | Ji et al. |
| 2006/0225242 A1 | 10/2006 | Oh et al. |
| 2011/0303244 A1 | 12/2011 | Faragher |
| 2016/0051107 A1 | 2/2016 | Saltiel-Gonsen et al. |

FOREIGN PATENT DOCUMENTS

| | | | |
|---|---|---|---|
| CN | 201131707 | | 10/2008 |
| CN | 201542558 U | * | 8/2010 |
| CN | 201701153 U | | 1/2011 |
| CN | 204478276 | | 7/2015 |
| ES | 1061988 U | | 5/2006 |
| WO | WO 2014/162165 A1 | | 10/2014 |

OTHER PUBLICATIONS

Patent Cooperation Treaty, "International Search Report and Written Opinion," dated Jul. 12, 2016, by Blaine R. Copenheaver, Authorized Office, in international application No. PCT/US2016/028313, document of 10 pages.

* cited by examiner

LIQUID FILTRATION VACUUM

CROSS-REFERENCE TO RELATED APPLICATIONS

This application claims priority to U.S. Provisional Application No. 62/122,300 filed Oct. 16, 2014, which is incorporated herein in its entirety.

BACKGROUND OF THE DISCLOSURE

Field of the Disclosure

The present disclosure pertains to the field of vacuum cleaners and more particularly to a water filtration vacuum cleaning device.

Description of Related Art

There are available today various types of vacuum cleaners. Vacuum devices typically utilize mechanical filters to filter dirt and debris from directed airflow before returning the filtered air in to the atmosphere. Some vacuum cleaners use bags to collect the dirt and debris, while some utilize a bin collection system. Vacuum cleaners that use bags, bins, and/or other mechanical filters lose efficiency with each use because dirt and dust captured by these components can clog the ports that allow air to flow through them. As a result, mechanical filters have to be replaced regularly, and still send germs, bacteria and dust back in to the atmosphere when in use. Those who suffer breathing disorders such as asthma or have allergies are especially vulnerable.

Purchasing mechanical filters and vacuum bags can make any vacuum very expensive to use and operate over time. Vacuum bags create germs and bacteria, as well as smell and lose efficiency. Known vacuum cleaners address some of these issues using, among other things, liquid filters. For example, a liquid filter may be a water bath that contacts the air flow and removes particulate matter. Liquid bath type cleaners in general have a significant advantage in that their filtration mechanism uses readily available water, thereby eliminating the need for replaceable filters. In addition, these machines provide a room humidifying effect since some of the water in the liquid bath becomes vaporized in the air discharged from the vacuum cleaner during use.

In some liquid bath vacuum cleaners, incoming air is directed in to a headspace above the liquid level and some of the air is pulled down in to the liquid by aspiration due to circulation or agitation of the liquid. These units nonetheless require a dry, mechanical filter because not all of the air is drawn through the water filter. When the mechanical filter is clean, this design of a liquid bath may require less overall power to move air through the vacuum cleaner because air does not travel directly in to the liquid and the motor and/or air flow generator are not pulling all of the intake air through the water. However, when the mechanical filter clogs, the overall efficiency of the liquid filter and vacuum cleaner are significantly reduced because the air flow through the mechanical filter and the vacuum cleaner is reduced. This in turn reduces the amount of liquid circulation and/or agitation, which further increases the amount of particulate matter in the exhaust air which potentially exacerbates the filter clog.

In another design of a liquid bath filter, the intake air is exhausted directly into the water for filtering. This design is advantageous because dirt, dust, debris, and contaminants are immediately absorbed by the water and only nominal levels of these contaminants are pulled out in the exhaust air. However, these units may require more power for use because the air flow generator is pulling the entire volume of intake air through the liquid in the liquid filter. Further, these units may require complicated assemblies and/or stationary components to ensure that fluid in a fluid container does not spill onto the componentry of the vacuum, or the surface being cleaned.

These and other vacuum cleaners may also use antimicrobial particles to contact and kill contaminants and thereby provide fresh, clean, safe exhaust air to the environment. Antimicrobial particles may be nanoparticles, e.g., nanometal ions, oxides, and salts placed in the liquid bath, air flow stream, and/or embedded in the airflow pathway/componentry. When the exemplary nanometals encounter a contaminant, the nanometal oxidizes and releases ions which contact the contaminant, killing it. The antimicrobial material may further purify the airflow in a liquid bath type cleaner and provide a humidifying effect that is cleaner, healthier, and smells better than exhaust from a dry, mechanical filter.

One type of vacuum cleaner that may incorporate a liquid filter and/or an antimicrobial material is a canister type. Canister type vacuum cleaners have a relatively stationary canister which is connected to a movable wand by a flexible connecting hose. One particular design of canister type vacuum cleaners is known as a liquid bath type. This type of vacuum cleaner directs incoming air, particulates, and microbes in to contact with a liquid bath, which is typically water that absorbs particulate matter. Air flow through the area containing the liquid bath also causes the liquid to circulate or agitate, which increases the efficiency of the absorption.

However, canister type vacuum cleaners have general disadvantages compared to upright-style vacuum cleaners. Upright-style vacuum cleaners are typically integrated units having an inlet, a filter, bag, and/or canister, and a handle connected together vertically in a single, portable unit. Upright-style vacuum cleaners may provide greater versatility and convenience than canister type vacuum cleaners because the upright is an integrated unit that can be moved and maneuvered by a single handle.

Incorporating a liquid filter on an upright unit may be difficult because uprights typically have less available space due to the integrated vertical design. Further, increasing the size or weight of an upright vacuum cleaner to accommodate a liquid filter is not generally desirable because it decreases maneuverability. Moreover, upright units may tip or tilt causing liquid to leak or spill from the vacuum and/or the vacuum cleaner componentry.

Moreover, upright units are typically used with the vertical assembly tilted to accommodate a user's movements and preferences during use. Incorporating a liquid filter on a vertical assembly risks leaking or spilling liquid on the surface being cleaned and/or the vacuum cleaner componentry, especially when the assembly is tilted. Incorporating the liquid filter below the tiltable vertical assembly may increase the size of the inlet portion and prevent the vacuum cleaner from advancing beneath furniture, beds, etc.

Accordingly, an upright-style vacuum cleaner having a liquid-tight liquid filter incorporated in to the vertical assembly is particularly advantageous.

Certain related art is discussed below.

U.S. Pat. No. 6,776,824 to Wen discusses a portable or hand-held vacuum cleaner or other appliance having a HEPA filter and one or more chemical or biological agents effective to kill bacteria, viruses, and the like.

U.S. Published App. No. 2006/0130265 discusses a vacuum cleaner having a dust collecting apparatus such as filter with a mesh filter. The surface of the filter housing contacting the filter is nano-coated with an antibiosis and sterilization material.

U.S. Published App. No. 2006/0174438 discusses a vacuum cleaner where intake air is first filtered by a mechanical filter before nano particles are generated and dispersed in to the "foreign substances" the vacuum cleaner.

U.S. Published App. No. 2006/0225242 describes a vacuum cleaner having a silver nano particle generator which sprays silver nano particles directly into an air flow for intake air after the intake air is filtered through a mechanical filter.

U.S. Pat. No. 7,819,127 issued to Huffman discloses a liquid vacuum cleaning apparatus including a metal ion generator coupled to a liquid distribution system such the vacuum cleaning apparatus sprays a metal ion solution on to the surface to be cleaned.

A vacuum cleaner device having a water bath filter plus HEPA filter is shown in U.S. Pat. No. 6,361,587. This cleaner teaches a separator for circulating the air and water within a water bath and further contains a second filtration system in the form of a HEPA filter.

Schoenewald, et al. provides a canister type vacuum cleaner having a dirt container partially filled with fluid in to which there enters a feed pipe extending from the intake opening in to the fluid in U.S. Pat. No. 6,508,867 to variously distribute the intake materials.

U.S. Pat. No. 8,728,222 discloses a wet type dust collector for a vacuum cleaner and further utilizes cyclone dust collection technology. The system includes a first separating unit to filter and discharge dust and a plurality of second water-filled centrifugal separating units.

BRIEF SUMMARY OF THE EXEMPLARY EMBODIMENTS

This disclosure relates generally to water filtration vacuums and more particularly a water filtration vacuum containing a nano-silver permeate for anti-bacterial and anti-fungal properties. The water filtration vacuum device draws in the air, forcing it in to the water and mixing it with microbial nanoparticles (e.g., nano-silver), returning clean, fresh water-washed, substantially sterile air in to the home environment.

It is an object of this disclosure to provide a water-filter vacuum cleaner having nano-silver impregnated qualities.

It is also an object of this disclosure to provide a water-filter vacuum cleaner in which the exhausted air is free of bacteria.

Another object of the present disclosure is to provide a water-filter vacuum cleaner where all the dirt is sucked in to the water and captured and mixed with the nano-silver for antibacterial and antifungal properties.

The disclosed exemplary embodiments of a water filtration vacuum cleaner comprise an upright-style vacuum cleaner having, among other things, a water tank and intake tubes for directing drawn air from the vacuum cleaner inlet to basin intake channels in the water tank. The basin intake channels extend below the water level such that intake air is exhausted from the basin intake channels directly in to the water.

In the exemplary embodiments the water tank includes reversible seals for sealing against the intake tubes while the vacuum cleaner is not operating, to prevent water from leaking out through the intake tubes. The reversible seals open when the vacuum cleaner is operating and there is airflow through the intake tubes.

The exemplary embodiments may further include nano-silver particles molded in to the inner wall of the water tank for contacting the air in the water tank.

The exemplary embodiments are broadly outlined above to provide a general basis for understanding the detailed description that follows. Additional embodiments of the present exemplary embodiments will be described in the detailed description and form part of the subject matter and scope of this disclosure and the claims appended hereto.

Further, the scope of this disclosure should not be limited to the details of construction or the arrangement of components set forth in the written description or Figures. Those of ordinary skill in the art will understand the exemplary embodiments may be practiced using other components, materials, structures, or designs consistent with this disclosure. In addition, the language and terminology This disclosure, including the Abstract of the disclosure, is representative providing for purposes of this disclosure and should not be considered limiting.

BRIEF DESCRIPTION OF THE DRAWINGS

Further objects, features, and advantages of the exemplary embodiments disclosed herein may be better understood with reference to the attached figures in which.

Exemplary embodiments are illustrated in reference figures of the drawings. It is intended that the embodiments and figures disclosed herein are to be considered to be illustrative rather than limiting.

DETAILED DESCRIPTION OF THE EXEMPLARY EMBODIMENTS

Figure 1:
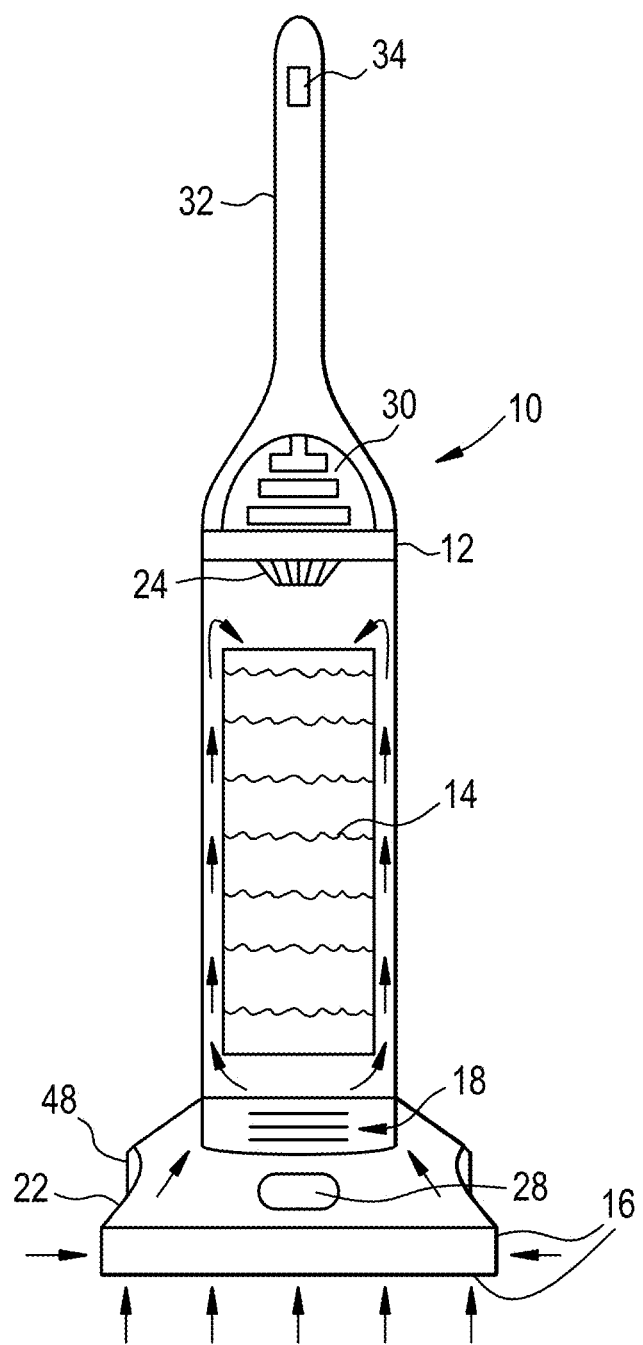
FIG. 1 is a front view of the vacuum cleaner of the present exemplary embodiment.
Figure 2:
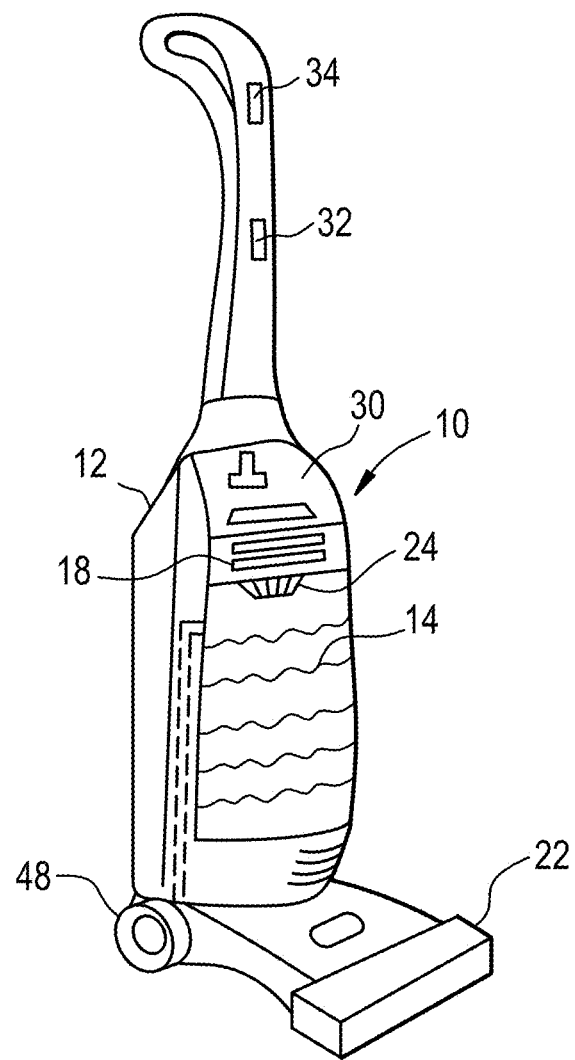
FIG. 2 is a perspective view of the exemplary embodiment.

Referring now to the figures and particularly to FIG. 1, there is shown an exemplary upright vacuum cleaner 10 having housing 12.

Removably contained within housing 12 is water tank 14. In an exemplary embodiment, the water tank 14 is easily removable from housing 12 to enable the convenient removal and replacement of liquid therein. Motor 20 (FIG. 4) is generally supported within the housing assembly 12.

Further shown is vacuum cleaner handle 32 and compartment 30 for storing attachments typically used with vacuum cleaners. Power suction head 22 contains a brushing unit (not shown in FIG. 1) typically contained in vacuum cleaners for brushing carpet free of debris. Suction motor 28 is supported in power suction head 22 in standard fashion. Wheels 48 are located on the four corners of power suction head 22 providing smooth rolling support of vacuum cleaner 10. In other embodiments, other wheel and support arrangements may be used.

In operation, switch 34 initializes motor 20 of vacuum cleaner 10 creating a suction force (vacuum) sufficient to draw air (shown by arrows) entrained with dust and dirt particulates in through the vacuum power nozzle head 22 and the inlet ports 16 and in to contact with the liquid filter water tank 14. Motor 20 contained within housing 12 operates separator 24, rotating the separation to speeds up to 16,000 rpm, for example, and forcing the dirt and debris to mix with water in water tank 14. The liquid filter water tank 14 may utilize one or more known liquid agents with filtration qualities, but contains water in an exemplary embodiment.

Figure 6:
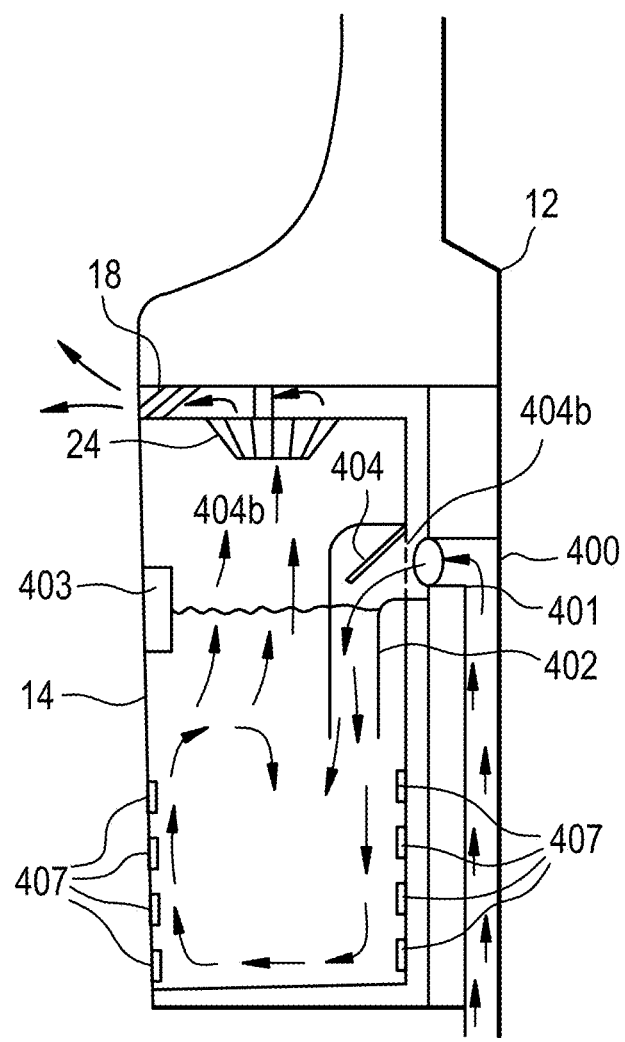
FIG. 6 is a detailed side view of an exemplary water tank intake.

Water tank 14 is typically a plastic water tank 14 molded using known techniques. Liquid nano silver is used as an antimicrobial component in the exemplary embodiment, although any suitable microbial agent as previous discussed may be used. The liquid nano silver is poured into plastic mold during processing. Only 1%-6% of the total liquid nano silver that could be placed in the mold is actually needed to achieve approximately 100% efficiency for killing contaminants in the water tank 14. Nano silver particles 407 are shown in FIG. 6, in the basin of the water tank 14 during operation of the vacuum cleaner. As shown in FIG. 6, nano silver particles are embedded into water tank interior wall and the circulation of water (shown by arrows), including contaminants, bring the contaminants into contact with the nano silver particles 407 to kill them.

Figure 3:
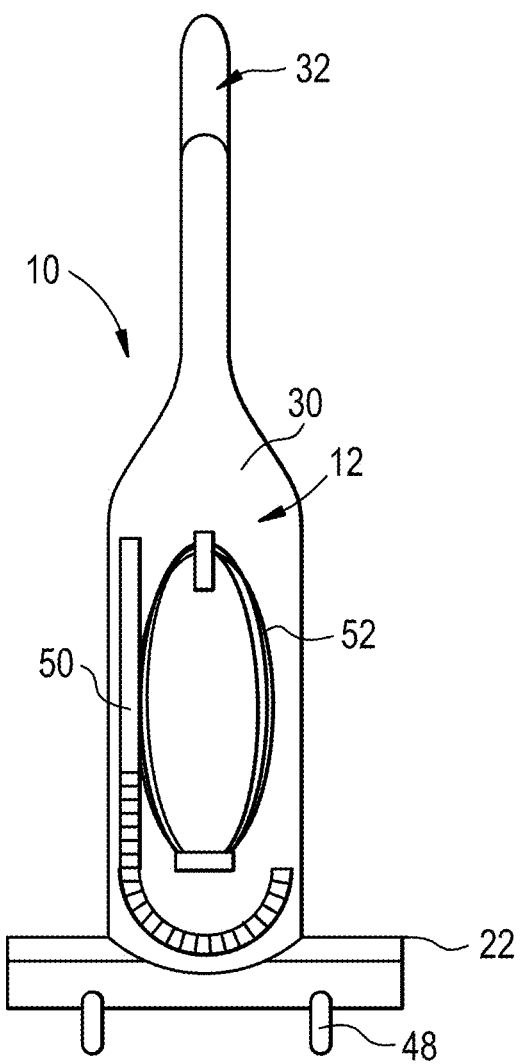
FIG. 3 is a rear elevation view of the exemplary embodiment.

As is typical of most vacuum cleaning devices, an exemplary embodiment as shown in FIG. 3 may have a hose 50 for cleaning with attachments (not shown) in areas where the power nozzle head 22 cannot accommodate. Further shown is power cord 52 utilized to provide power to the vacuum cleaner 10 wrapped in typical fashion around stays.

Figure 4:
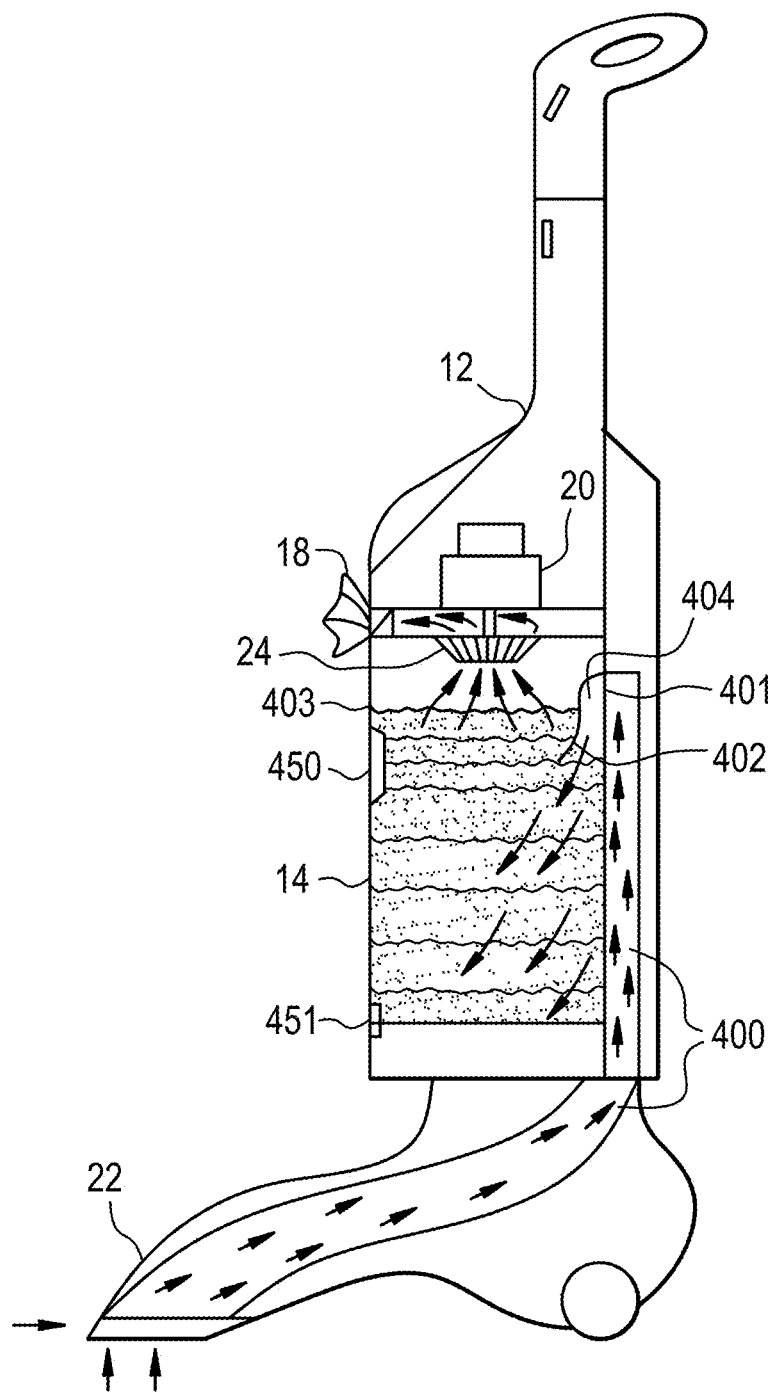
FIG. 4 is a side view of an exemplary embodiment of the device.
Figure 5:
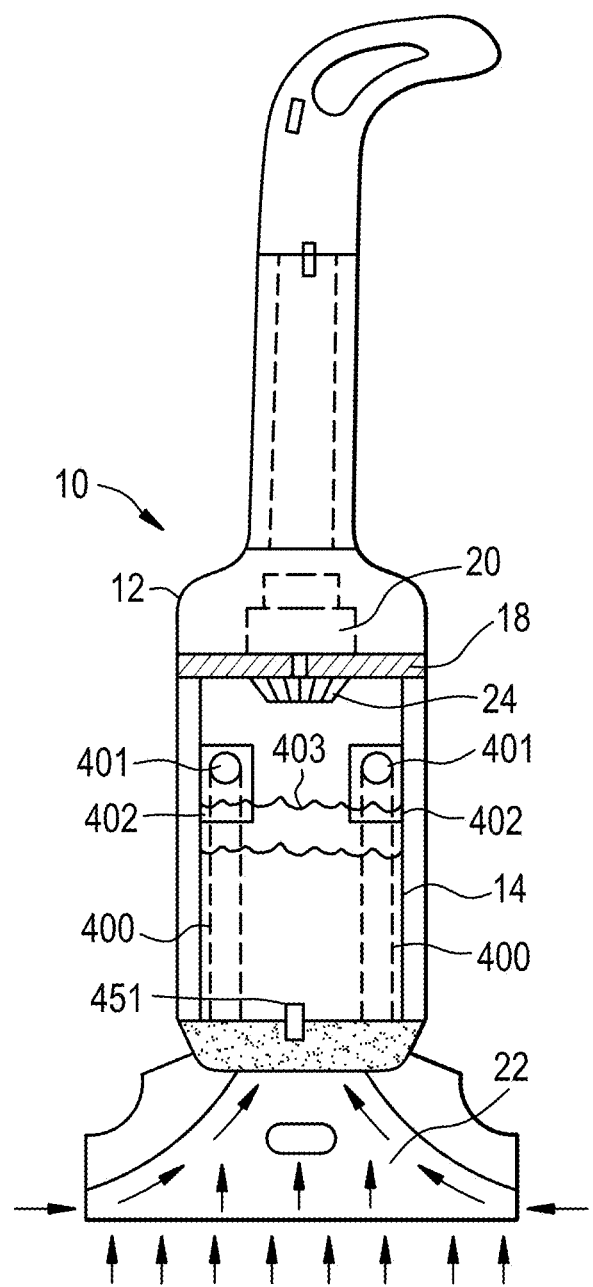
FIG. 5 is a front view of an exemplary embodiment.

FIGS. 4 and 5 are respectively a side view and a front view of an exemplary embodiment of the water filtration vacuum cleaner 10. As shown in FIG. 4, water tank 14 is inserted in to housing 12 between suction head 22 and motor 20. Handle 450 assists a user with inserting water tank 14 in to, and removing it from housing 12. When water tank 14 is inserted in to housing 12, latch 451 secures water tank 14 therein.

Motor 20 is located in the housing above the water tank 14 and separator 24 is attached to the bottom of motor 20. When the water tank 14 is in place within the housing 12, separator 24 protrudes through an opening 502 (FIG. 11) on the top of water tank 14. During operation of the vacuum cleaner 10, separator 24 is rotated by the motor at high speeds, for example and without limitation, approximately 16,000 rpm, to create airflow through the vacuum cleaner 10. Air (shown by arrows) is drawn from outside the housing 12 up intake 400 on either side of the housing 12, through the water tank 14, in to the separator 24, and out exhaust ports 18.

Intake 400 forms an airflow path from the power suction head 22 to inlet port 401 on water tank 14. Inlet port 401 forms an airflow path to the interior of water tank 14. Inlet port 401 is above the water level 403 inside water tank 14 to prevent water from entering inlet port 401 and intake tube 400 during operation. Air exhausted from intake 400 passes through inlet port 401 and in to basin intake channel 402, which directs the air in to the water beneath the water level 403.

In the front view of FIG. 5, intake 400 is drawn in dashed lines to indicate that it is behind water tank 14. Similarly, basin intake tank 402 is shown transparent to depict inlet port 401.

The flow path of the air is further detailed in FIG. 6. FIG. 6 shows a detailed view of air traveling up intake 400, into inlet port 401, past sealing flap 404 (described below), and down through basin intake channel 402 in to water below water level 403 where contaminants can be immediately trapped and absorbed by the water. Antimicrobial particles such as, for example and without limitation, nano silver particles 407 are embedded into the water tank wall 14 and FIG. 6 shows a random flow path of air through the swirling water.

Contaminants in the water/air that contact the nano silver 407 are killed due to the oxidation of the antimicrobial nano silver 407 in the exemplary embodiment. The arrows show an arbitrary circulation path that air entering the water tank 14 may take once inside the water, including contacting the antimicrobial nanoparticles 407. Separator 24 creates the airflow for drawing the air up through intake 400, into tank 14 through inlet port 401, creating a mixing action for water in water tank 14, and drawing and separating the clean exhaust air from the heavier water and particulates.

The exemplary embodiments achieve more efficient operation than current vacuum cleaner systems due in part to the exhaust of intake water beneath water level 403 in water tank 14. First, contaminants are immediately trapped and absorbed by the water before having a chance to be present in the headspace above the water level 403. This allows separator 24 to draw and exhaust the clean air from the water without a separate dry, mechanical filter that is prone to clogging.

In addition, the efficiency of the liquid filter and the vacuum cleaner 10 in general is increased in the exemplary embodiments. Because there is no dry filter to clog or fail, a constant increase in efficiency of the liquid filter is realized. As a result, the efficiency of the vacuum cleaner is increased allowing a higher average intake velocity and a greater volume of airflow through the unit.

Figure 7:
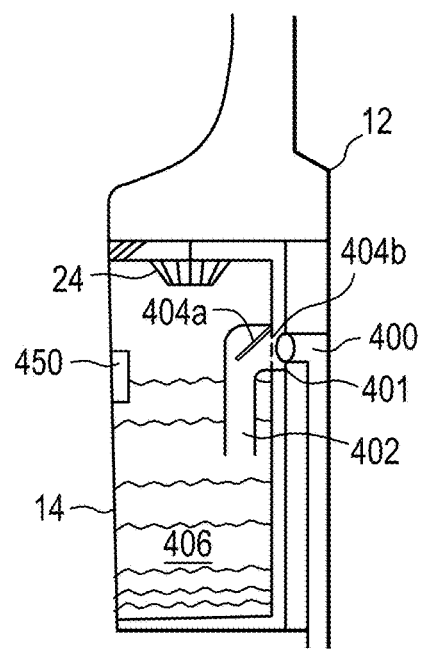
FIG. 7 is a side view of inlet port flap and biasing mechanism of an exemplary embodiment.

Another benefit of the current exemplary embodiment is that it will resist spills and leaks due to the inlet port seal 404 shown in FIGS. 4-7. With reference now to FIGS. 4-7, water tank 14 includes inlet port seal 404 for closing inlet port 401 to prevent leaks when the vacuum cleaner 10 is not operating. When the vacuum cleaner 10 is operating, the air flow from intake 400 to basin intake channel 402 forces inlet port seal 404 open, allowing air to pass through and down into the water in water tank 14 via basin intake channel 402. FIG. 7 shows the inlet port seal 404 in open 404a and closed 404b (dashed line) configurations. When the vacuum cleaner 10 is not operating, i.e., there is no airflow through intake tube 400, inlet port seal 404 is forced to the closed configuration 404b by a biasing mechanism such as springs 405 shown in FIGS. 8 and 9. When the vacuum cleaner 10 is operating and there is airflow through intake tube 400 and inlet port 401, the force of the airflow overcomes the biasing force and urges the inlet port seal 404 to the open position 404a as depicted in FIGS. 4 and 6.

Figure 8:
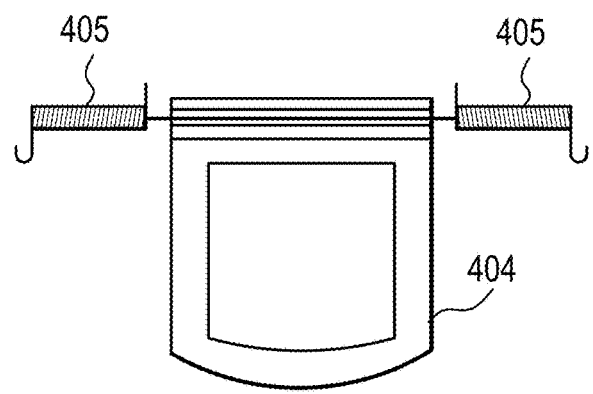
FIG. 8 is a view of inlet port flap and biasing mechanisms in an exemplary embodiment.
Figure 9:
FIG. 9 is a is a side view of inlet port flap and biasing mechanism in an exemplary embodiment.

In the exemplary embodiment shown by FIGS. 7-9, inlet port seal 404 is made from rubber and is generally U-shaped with two springs 405 attached to the top of the 'U'. The springs 405 are also attached to the wall of the water tank 14 proximate inlet port 401.

The springs 405 urge the inlet port seal 404 towards the inlet port 401. In the absence of an opposing force, inlet port seal 404 will seal against inlet port 401 and/or intake tube 400 as shown in the closed configuration 404b of FIG. 5. Thus, when the vacuum cleaner 10 is not in operation, inlet port seal 404 will prevent water from leaking out of the water tank 14 through the inlet port 401 even if the vacuum cleaner 10 is tipped or tilted.

In the exemplary embodiment inlet port seal 404 includes a rubber gasket (not shown) configured to seal against intake tube 400. In other embodiments inlet port seal 404 may have any configuration and may be made from any known material(s) suitable for use consistent with this disclosure, for example and without limitation, plastics, laminates, or foams. Similarly, biasing mechanism may include any known material or structure for providing an urging force as described above, for example, resilient or elastic materials, counterweights, magnetic attachments, etc., and the biasing mechanism may attach to the inlet port seal 404 and other components by any suitable means such as adhesives, welding, molding, etc.

In some embodiments, a biasing mechanism may be integral or inherent to an inlet port seal 404, such as an inlet port seal 404 made from a resilient or elastic material, and in the same or other embodiments the inlet port seal 404 and/or biasing mechanism may be integral to, e.g., the water tank 14, inlet port 401, and/or intake tube 400, for example as a hinged mechanism formed on one of the components.

Figure 10:
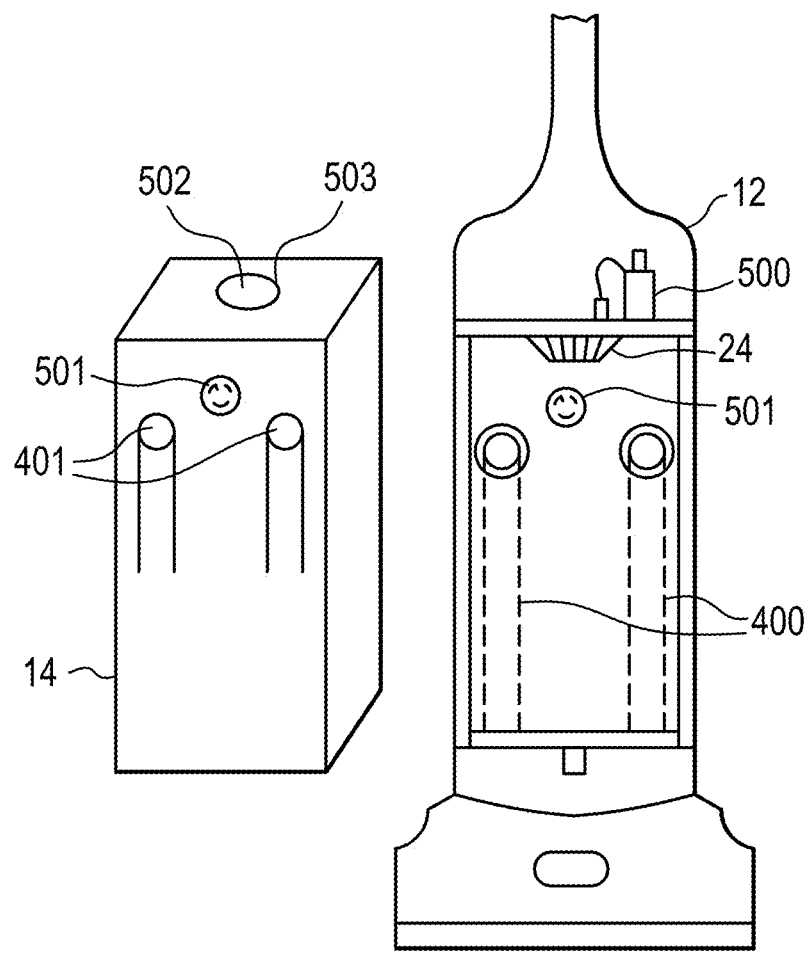
FIG. 10 is a view of the exemplary water tank detached from the housing.

FIG. 10 shows one such alternative embodiment of an inlet port seal 404 assembly. As shown in FIG. 8, solenoid 500 is provided in housing 12 and is electrically connected to socket 501 on housing. When water tank 14 is inserted into housing 12 sockets 501 connect and provide power to water tank 14 for actuating the inlet port seals 404 to the closed position 404b via the solenoid.

As previously indicated, FIG. 7 further depicts opening 502 on top of water tank 14. Opening 502 may be used to empty and fill water tank 14, but is also configured to accept separator 24 when the water tank 14 is inserted into housing 12. Water tank opening 502 includes a raised lip 503 in an exemplary embodiment for sealing against a motor gasket 25 as will be explained with respect to FIGS. 9-11. In other embodiments opening may be sealed any number known means suitable creating a water-tight seal, such as frictional engagements, slotted grooves, o-rings, etc. In general, the centrifugal force generated by separator 24 while vacuum cleaner 10 is in operation is sufficient to deflect any water away from the motor 20 assembly seal.

Figure 11:
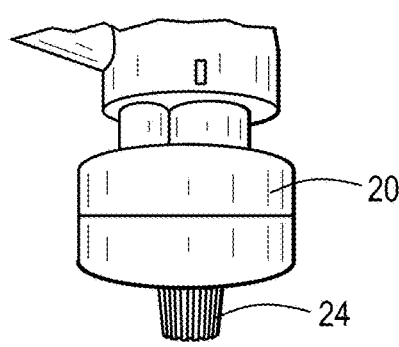
FIG. 11 is an exemplary view of the motor.
Figure 12:
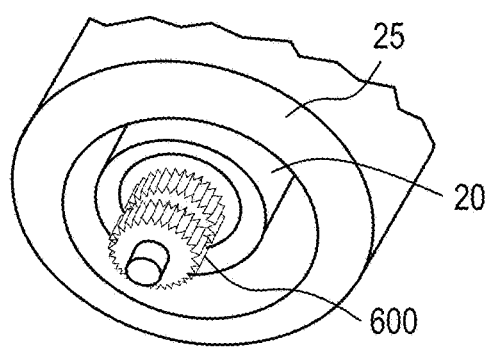
FIG. 12 is an exemplary view of the motor.
Figure 13:
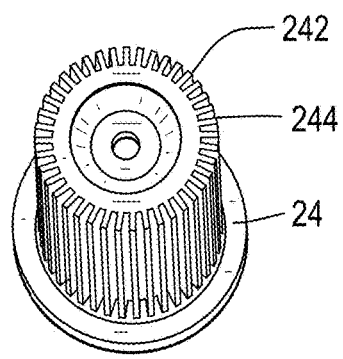
FIG. 13 is an exemplary view of the separator.

FIGS. 11-13 show additional details regarding the motor 20 and separator 24 engagement. As shown in FIG. 9 separator 24 extends away from a bottom of motor 20. Separator 24 is shown in FIG. 11. The ribs 242 and grooves 244 of separator 24 (FIG. 11) create the required airflow for the vacuum cleaner 10 during operation when the separator is rotating. FIG. 10 shows the bottom of motor 20 including gears 600 and gasket 25. During operation, separator 24 is connected to gears 600 such that motor 20 rotates separator 24.

Lip 503 around opening 502 on the top of water tank is configured to engage the motor gasket 25 and seal the water tank 14 to the motor 20 when the water tank 14 is inserted in housing 12.

Figure 14:
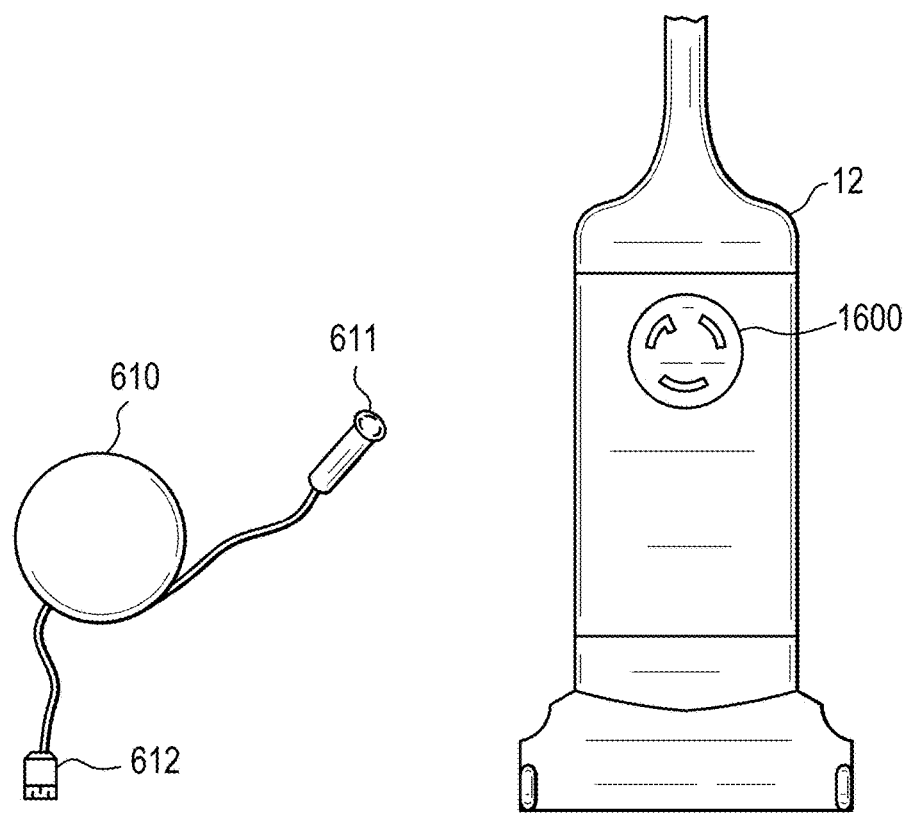
FIG. 14 is an exemplary view of the power supply.

FIG. 14 shows an exemplary power connection for the disclosed device. The back of housing 12 includes a circular connector 1600 in an exemplary embodiment that mates with a female circular connector 611 on a retractable power cord organizer 610. On an opposite end is a standard 120V wall outlet 612, which may be left plugged in when a user is finished using the vacuum cleaner.

The present disclosure and further illustrated figures are not to be construed in any way as imposing limitations upon the scope of this disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

The invention claimed is:

1. An upright vacuum cleaner that filters air using only water, the upright vacuum cleaner comprising:
    a housing having a front, back, top, and bottom;
    a handle extending from the top of the housing;
    a suction head extending from the bottom of the housing;
    an air intake that conveys air from the suction head, upwardly through the housing, and to an inlet port;
        the inlet port formed from a first port and a second port;
        the first port of the inlet port located within a wall of the housing, allowing air to exit the air intake;
    a water tank intended to hold water to act as a filter;
        the water tank removably affixed within the housing, the housing partially surrounding the water tank when the water tank is installed;
        the second port of the inlet port located within a wall of the water tank, allowing air to enter the water tank;
        a basin intake channel carrying air from the second port and into the water;
        the first port and the second port connected when the water tank is installed within the housing;
        the water tank including an upper opening;
        the water tank molded from a combination of plastic and nano-silver;
    an inlet port seal mechanically connected to the inlet port;
        a spring affixed to the inlet port seal, the spring acting to close the inlet port seal to prevent water leakage;
    a separator powered by a first motor, the separator affixed to the housing and protruding outward from the housing;
        the separator drawing the air through the water tank, removing water entrained in the air, and pushing the resulting air to an exhaust; and
        the separator passing through the upper opening of the water tank when the water tank is installed within the housing;
    wherein the water tank is non-structural, and thus is readily removable without affecting the ability of the upright vacuum to remain standing.

2. The upright vacuum cleaner of claim 1, wherein the suction head further comprises:
    a second motor;
    the second motor powering a rotating brush;
    whereby the rotating brush acts to lift debris from an underlying surface, allowing the debris to be lifted away by the air.

3. The upright vacuum cleaner of claim 1, further comprising:
    a two-part socket, the first part affixed to the housing, the second part located on the water tank;
    a solenoid-actuated inlet port seal electrically connected to the socket;
    whereby installation of the water tank connects the first part of the two-part socket to the second part of the two-part socket, activating the solenoid-actuated inlet port seal, and closing the inlet port.

4. The upright vacuum cleaner of claim 1, further comprising:
- a male circular connector protruding from the back of the housing;
- a retractable power cord contained within a cord housing; the cord housing including a female circular connector;
- whereby the male circulator connector and the female circulator connector mate to affix the retractable power cord to the upright vacuum cleaner.

5. An upright vacuum cleaner that filters air using only water, the upright vacuum cleaner comprising:
- a housing having a front, back, top, and bottom;
- a handle extending from the top of the housing;
- a suction head extending from the bottom of the housing;
- an air intake that conveys air from the suction head, upwardly through the housing, and to an inlet port;
  - the inlet port formed from a first port and a second port;
  - the first port of the inlet port located within a wall of the housing, allowing air to exit the air intake;
- a water tank intended to hold water to act as a filter;
  - the water tank removably affixed within the housing, the housing partially surrounding the water tank when the water tank is installed;
  - the second port of the inlet port located within a wall of the water tank, allowing air to enter the water tank;
  - a basin intake channel carrying air from the second port and into the water;
  - the first port and the second port connected when the water tank is installed within the housing;
  - the water tank including an upper opening;
  - the water tank molded from a combination of plastic and nano-silver;
- an inlet port seal mechanically connected to the inlet port;
  - a spring affixed to the inlet port seal, the spring acting to close the inlet port seal to prevent water leakage;
- a two-part socket the first part affixed to the housing, the second part located on the water tank;
  - a solenoid-actuated inlet port seal electrically connected to the socket;
  - whereby installation of the water tank connects the first part of the two-part socket to the second part of the two-part socket, activating the solenoid-actuated inlet port seal, and closing the inlet port;
- a separator powered by a first motor, the separator affixed to the housing and protruding outward from the housing;
  - the separator drawing the air through the water tank, removing water entrained in the air, and pushing the resulting air to an exhaust; and
  - the separator passing through the upper opening of the water tank when the water tank is installed within the housing;
- wherein the water tank is non-structural, and thus is readily removable without affecting the ability of the upright vacuum to remain standing.

6. The upright vacuum cleaner of claim 5, wherein the suction head further comprises:
- a second motor;
- the second motor powering a rotating brush;
- whereby the rotating brush acts to lift debris from an underlying surface, allowing the debris to be lifted away by the air.

7. The upright vacuum cleaner of claim 5, further comprising:
- a male circular connector protruding from the back of the housing;
- a retractable power cord contained within a cord housing;
- the cord housing including a female circular connector;
- whereby the male circulator connector and the female circulator connector mate to affix the retractable power cord to the upright vacuum cleaner.

8. An upright vacuum cleaner that filters air using only water, the upright vacuum cleaner comprising:
- a housing having a front, back, top, and bottom;
- a handle extending from the top of the housing;
- a suction head extending from the bottom of the housing;
  - the suction head including a second motor;
  - the second motor powering a rotating brush;
  - whereby the rotating brush acts to lift debris from an underlying surface, allowing the debris to be lifted away by the air;
- an air intake that conveys air from the suction head, upwardly through the housing, and to an inlet port;
  - the inlet port formed from a first port and a second port;
  - the first port of the inlet port located within a wall of the housing, allowing air to exit the air intake;
- a water tank intended to hold water to act as a filter;
  - the water tank removably affixed within the housing, the housing partially surrounding the water tank when the water tank is installed;
  - the second port of the inlet port located within a wall of the water tank, allowing air to enter the water tank;
  - a basin intake channel carrying air from the second port and in to the water;
  - the first port and the second port connected when the water tank is installed within the housing;
  - the water tank including an upper opening;
  - the water tank molded from a combination of plastic and nano-silver;
- an inlet port seal mechanically connected to the inlet port;
  - a spring affixed to the inlet port seal, the spring acting to close the inlet port seal to prevent water leakage;
- a separator powered by a first motor, the separator affixed to the housing and protruding outward from the housing;
  - the separator drawing the air through the water tank, removing water entrained in the air, and pushing the resulting air to an exhaust;
  - the separator passing through the upper opening of the water tank when the water tank is installed within the housing;
- a male circular connector protruding from the back of the housing;
- a retractable power cord contained within a cord housing; and
- the cord housing including a female circular connector;
- whereby the male circulator connector and the female circulator connector mate to affix the retractable power cord to the upright vacuum cleaner;
- wherein the water tank is non-structural, and thus is readily removable without affecting the ability of the upright vacuum to remain standing.

9. The upright vacuum cleaner of claim 8, further comprising:
- a two-part socket, the first part affixed to the housing, the second part located on the water tank;
- a solenoid-actuated inlet port seal electrically connected to the socket;
- whereby installation of the water tank connects the first part of the two-part socket to the second part of the two-part socket, activating the solenoid-actuated inlet port seal, and closing the inlet port.

10. The upright vacuum cleaner of claim 8, further comprising:

a male circular connector protruding from the back of the housing;
a retractable power cord contained within a cord housing; the cord housing including a female circular connector;
whereby the male circulator connector and the female circulator connector mate to affix the retractable power cord to the upright vacuum cleaner.

* * * * *